(12) United States Patent
Barlog

(10) Patent No.: US 7,704,438 B2
(45) Date of Patent: Apr. 27, 2010

(54) PROCESS FOR PRODUCING A PERMANENTLY MAGNETIC MOLDING

(75) Inventor: Werner Barlog, Engelskirchen (DE)

(73) Assignee: BARLOG plastics GmbH, Engelskirchen (DE)

( * ) Notice: Subject to any disclaimer, the term of this patent is extended or adjusted under 35 U.S.C. 154(b) by 8 days.

(21) Appl. No.: 12/150,318

(22) Filed: Apr. 25, 2008

(65) Prior Publication Data

US 2009/0267265 A1 Oct. 29, 2009

(51) Int. Cl.
*B29C 35/02* (2006.01)

(52) U.S. Cl. .................................... 264/429

(58) Field of Classification Search .............. 264/429
See application file for complete search history.

(56) References Cited

U.S. PATENT DOCUMENTS

| 2003/0057606 A1* | 3/2003 | Brix et al. ............... 264/328.6 |
| 2003/0220443 A1 | 11/2003 | Kameda et al. |
| 2006/0251754 A1* | 11/2006 | Herring ...................... 425/3 |

FOREIGN PATENT DOCUMENTS

| DE | 2 064 811 | 7/1972 |
| DE | 10 2004 041 746 A1 | 3/2006 |
| EP | 0 298 764 B1 | 1/1989 |
| EP | 1 146 085 A1 | 10/2001 |
| EP | 1 267 406 A2 | 12/2002 |
| EP | 1 293 323 B1 | 3/2003 |
| JP | 11116820 | 4/1999 |
| JP | 2000302970 | 10/2000 |
| JP | 20022322361 | 11/2002 |
| JP | 20005320390 | 11/2005 |

OTHER PUBLICATIONS

Derwent abstract of DE102006008077.*
English abstract of JP61029874A.*

* cited by examiner

*Primary Examiner*—Khanh Nguyen
*Assistant Examiner*—Xue Liu
(74) *Attorney, Agent, or Firm*—Pauley Petersen & Erickson

(57) ABSTRACT

A method for producing a permanently-magnetic part, made from a polymeric support material filled with magnetic filler materials on the basis of silicon caoutchouc, hot-vulcanized from at least one starting material, in which the at least one starting material of the silicon caoutchouc is mixed prior to vulcanization with 50 to 95% by weight of high energy ferrite particles of a density of 5.0 to 5.2 $g/cm^3$ and an average particle size of 1.5 to 2.5 μm as the magnetic filler material and is homogenized. Subsequently, the homogenized mixture is introduced into a mold cavity by a temperature-regulated screw and is cross-linked by vulcanization in the mold cavity by the application of heat for forming the molding, wherein during cross-linking a static magnetic field is applied to the mold cavity and the magnetic filler materials are magnetized and aligned in the silicon caoutchouc being cross-linked.

14 Claims, No Drawings

PROCESS FOR PRODUCING A PERMANENTLY MAGNETIC MOLDING

BACKGROUND OF THE INVENTION

1. Field of the Invention

This invention relates to a method for producing a permanently-magnetic molding, made from a polymeric support material filled with magnetic filler materials of silicon caoutchouc, hot-vulcanized from at least one starting material.

2. Discussion of Related Art

After being magnetized, permanently-magnetic moldings retain magnetization over an extended period of time, so that metal alloys of iron, nickel and aluminum with the addition of cobalt, manganese and copper, or ceramic oxide materials, are often employed. It is also possible to produce magnets by sintering processes from so-called rare earths such as, for example, cobalt-samarium or neodymium-iron-boron. An alternative way of proceeding when producing permanently-magnetic moldings is by embedding magnetic filler materials into a polymeric support material, wherein the magnetic filler materials are introduced at a high fill rate into the polymer matrix of the support material in the form of small particles and are then accessible to magnetization. The advantage of such magnets provided with a polymeric support material lies in their simple large-scale technical production, while such magnets can also have more complex shapes.

It is, for example, possible to produce such moldings in an injection-molding process from polymeric support materials filled with metallic filler materials, as described by European Patent Reference EP 0 298 764 B1, for example.

Various plastics are suitable as polymeric support materials, such as polyamides, polyolefins, and the like.

It is known from German Patent Reference DE 10 2004 041 746 A1 to provide a caoutchouc mixture, for example on the basis of silicon caoutchouc with a non-magnetic filler material and at least one nano-sized magnetic filler material, and then to expose this caoutchouc mixture to an alternating magnetic field, in particular microwave radiation, to cause heating and shaping of the molded body. A more efficient production method for producing a permanently-magnetic molding on the basis of silicon caoutchouc cannot be derived from German Patent Reference DE 10 2004 041 746 A1.

It is known to hot-vulcanize silicon caoutchouc, including two silicon caoutchouc components as the starting material, in an injection mold and to thus produce a molded body, as taught by European Patent Reference EP 1 293 323 B1, for example. However, no addition of magnetic filler materials and/or magnetization for producing molded magnetic bodies is provided.

SUMMARY OF THE INVENTION

It is one object of this invention to provide a method for producing a permanently-magnetic molding, made from a polymer support material filled with magnetic filler materials on the basis of silicon caoutchouc, which can be executed in a simple manner and makes possible the production of permanently-magnetic moldings, which have a high magnetic flux density and a homogeneous distribution of the magnetic field.

In accordance with this invention, a method for attaining the stated object is taught by this specification and the claims.

DETAILED DESCRIPTION OF THE INVENTION

The method of this invention is distinguished by the chronological succession of the following steps.

1. Initially, the at least one starting material of the silicon caoutchouc, which is preferably made available in liquid form, is mixed with 50 to 95% by weight of high energy ferrite particles of a density of 5.0 to 5.2 $g/cm^3$ and an average particle size of 1.5 to 2.5 µm as the magnetic filler material, and is homogenized as much as possible.

2. Then the starting material, which is mixed with the magnetic filler material and homogenized, is introduced into a mold cavity by a temperature-regulated screw and is cross-linked by vulcanization in the mold cavity by the application of heat for forming the mold, wherein during cross-linking a static magnetic field is created in the mold cavity and the magnetic filler materials are magnetized and/or aligned in the silicon caoutchouc being cross-linked.

Thus, in accordance with this invention, the cross-linking mechanism, known per se, for hot-vulcanizing silicon caoutchouc, is employed, wherein the starting material is preferably present in the liquid phase and vulcanization is performed using the heat in the mold cavity, and the desired mold is formed.

In accordance with this invention, over the period of time in which the starting material, which forms the mixture capable of reacting and is filled with magnetic filler materials, is simultaneously introduced into the mold cavity and begins to cross-link, a static magnetic field is simultaneously generated in the mold cavity, so that the magnetic filler materials introduced into the starting material are magnetized, by which the finally appearing molding is given permanently-magnetic properties.

Because at the start of the molding or cross-linking process the starting material is preferably present in the mold cavity in the liquid phase, it is possible for the magnetic filler material contained therein to become aligned along the flux lines of the applied magnetic field before setting of the molding while filling the mold cavity occurs, by which the magnetic filler materials are firmly embedded in the polymer matrix and are prevented from a subsequent deviation from the assumed orientation.

In connection with customary vulcanization temperatures of approximately 100 to 220° C. in the molding tool, cross-linking speed takes place, for example, at a wall thickness of the molding of approximately 5 s/mm, so that sufficient time remains for the alignment of the magnetic filler materials in the initially liquid, reaction-capable mixture of the starting material. If required, continued cross-linking can be finished during a subsequent temperature-controlled step.

As a result, a permanently-magnetic molding in the configuration predetermined by the mold cavity is obtained which, based on the high fill degree with magnetic filler materials and the alignment of the magnetic filler materials within the polymer matrix, is distinguished by high flux density and particular uniformity of the magnetic field.

At the same time, the use of the polymeric support material made of hot-vulcanized silicon caoutchouc assures that the permanently-magnetic molding thus produced can be employed without problems even in applications under high temperature loads, because silicon caoutchouc is distinguished by a high permanent heat retention of up to 250° C. and is also very resilient.

Permanently-magnetic moldings on the basis of a polymeric support material produced in accordance with this invention can also be dependably employed in surroundings of high prevailing temperatures, so that it is possible to open areas of application which up to now could not be used for magnets based on polymeric support materials, such as polyolefins, for example.

It has been surprisingly shown within the scope of this invention that, by an appropriate selection of the starting material for the silicon caoutchouc, it is possible to fill the latter with approximately 50 to 95% by weight of a magnetic filler material and to mix it with it, so that high magnetic flux densities could be achieved in the permanently-magnetic molding to be produced.

High-energy ferrite particles of a density of 5.0 to 5.2 g/cm$^3$ and a mean particle size of 1.5 to 2.5 μm are employed, their residual magnetism preferably is 155 to 180 mT, and they have an intrinsic coercivity of 155 to 250 kA/m.

For achieving continuous and rapidly occurring cross-linking of the starting materials introduced into the mold cavity, the mold cavity is heated to a suitable temperature in the range between 100 and 220° C., wherein the temperature should be selected by one skilled in the art as a function of the respective layout of the molding and of the starting material.

The starting material for producing the hot-vulcanized silicon caoutchouc can be present as a 1-component or 2-component system.

In case of employing a starting material formed by a 1-component system, the magnetic filler materials are preferably introduced into the starting material by an agitating device or the like and are homogeneously mixed into it. Then, charging of the processing machinery, i.e. the injection-molding machine or the extruder, can take place by pressure from a cartridge.

In case of employing a starting material formed by a 2-component system, the latter is preferably cooled in a static mixer for achieving good homogeneity after the introduction of the magnetic filler material in an amount of 50 to 95% by weight, is homogenized and moved out of static mixer by a temperature-regulated, for example cooled, screw and introduced into a heated tool defining the mold cavity and is shaped into the molded part, such as is generally known from the method for injection-molding of liquid silicon caoutchouc (LSR). In accordance with this invention, the starting material is filled with a large portion of the suitable magnetic filler materials to begin with, and a strong magnetic field is generated in the mold cavity during cross-linking and formation of the molding in the mold cavity in order to magnetize the magnetic filler materials in the silicon caoutchouc being cross-linked and to align them. Besides the injection-molding process, processing in accordance with the extrusion method can also be considered.

For example, the applied magnetic field can be created by the placement of permanent magnets or electromagnets of sufficient strength and number in, or on the walls of the tool in which the mold cavity is formed.

The method in accordance with this invention is suitable for application in connection with various starting materials suitable for the production of hot-vulcanized silicon caoutchouc.

In accordance with one embodiment of this invention, a vulcanization-stable 1-component system is employed as the starting material, such as is commercially available in the form of a system which is instantly capable of being processed, for example under the name Addisil IND 1040 E (Addisil is a trademark of the Momentive Performance Materials Holding Inc.)

It has been shown within the scope of this invention for a 1-component system to be filled with approximately 50 to 95% by weight of magnetic filler materials for producing a hot-vulcanized silicon caoutchouc of high homogeneity.

It is also within the scope of this invention to use a 2-component system of two separately provided silicon caoutchouc components as the starting material, which are initially mixed into a mixture capable of vulcanization in order to form the silicon caoutchouc under cross-linking. An example of such a starting material is commercially available under the name Addisil IND 2040 E (Addisil is a trademark of the Momentive Performance Materials Holding Inc.). In this case, at least one of the components, but preferably both components, are mixed with the hard ferrite particles as the magnetic filler material and are homogenized, the components filled with the magnetic filler materials are subsequently mixed in an intermediate step to form the vulcanizable mixture and are homogenized, and the mixture is then introduced into the mold cavity, where it is cross-linked to form the molding while heat and magnetization and/or the alignment of the magnetic filler materials are performed.

Again, the mixing and homogenization of the two components of the starting material can take place in a static, and preferably cooled mixer.

Independently of the selection of the starting material, the method in accordance with this invention is suitable for integration into an injection-molding process, as well as integration into an extrusion process, for producing the molded parts.

In the case of an integration into an injection-molding process, the starting material capable of being vulcanized is introduced into the heated injection-molding tool in which the mold cavity is defined and is shaped there, with the introduction of heat, into the molding in the manner already described, while a sufficiently strong magnetic field is generated within the mold cavity, which causes the magnetization and/or alignment of the magnetic filler materials contained in the starting material.

To the extent the method in accordance with this invention is integrated into an extrusion process, the starting material, which is capable of being vulcanized and has been filled with the magnetic filler materials, is continuously fed into an extrusion tool and is shaped into the molding in the course of the passage through the tool, while simultaneously a sufficiently strong magnetic field is generated inside the extrusion tool, which causes the desired magnetization and/or alignment of the magnetic filler materials contained in the starting material.

If needed, it is possible to add a temperature-regulating step to the molding process for forming the magnetized molded part, such as the produced moldings are introduced for a defined period of time into a temperature-regulating furnace until cross-linking of the silicon caoutchouc is finished.

The invention claimed is:

1. A method for producing a permanently-magnetic molding, made from a polymeric support material filled with magnetic filler materials on a basis of silicon caoutchouc, hot-vulcanized from at least one starting material, the method comprising mixing the at least one starting material of the silicon caoutchouc prior to vulcanization with 50 to 95% by weight of high energy ferrite particles of a density of 5.0 to 5.2 g/cm$^3$ and an average particle size of 1.5 to 2.5 μm as a magnetic filler material to obtain a homogenized mixture, subsequently introducing the homogenized mixture into a mold cavity by a temperature-regulated screw and cross-linking by vulcanization in the mold cavity by an application of heat for forming the molding, and during cross-linking applying a static magnetic field to the mold cavity to magnetize and align the magnetic filler materials in the silicon caoutchouc being cross-linked.

2. The method in accordance with claim 1, wherein the magnetic filler materials have a residual magnetism of 155 to 180 mT and an intrinsic coercivity of 155 to 250 kA/m.

3. The method in accordance with claim 2, wherein the at least one starting material is employed in a liquid phase.

4. The method in accordance with claim 3, wherein the mold cavity is heated to a temperature of 100° C. to 200° C.

5. The method in accordance with claim 4, wherein a 1-component system capable of vulcanization is employed as the starting material.

6. The method in accordance with claim 4, wherein a 2-component system is employed as the starting material, in which at least one of the components is mixed together with the magnetic filler material and homogenized, and the components are subsequently mixed to form a vulcanizable mixture and are homogenized, and the mixture is then introduced into the mold cavity and is cross-linked, while the magnetic filler materials are magnetized and aligned.

7. The method in accordance with claim 6, wherein the starting material is cooled in a static mixer and is homogenized and is transferred out of the static mixer by a cooled screw into a heated tool defining the mold cavity and is shaped into the molding by injection-molding or by an extrusion method.

8. The method in accordance with claim 7, wherein the molding is temperature-regulated in a subsequent step.

9. The method in accordance with claim 1, wherein the at least one starting material is employed in a liquid phase.

10. The method in accordance with claim 1, wherein the mold cavity is heated to a temperature of 100° C. to 200° C.

11. The method in accordance with claim 1, wherein a 1-component system capable of vulcanization is employed as the starting material.

12. The method in accordance with claim 1, wherein a 2-component system is employed as the starting material, in which at least one of the components is mixed together with the magnetic filler material and homogenized, and the components are subsequently mixed to form a vulcanizable mixture and are homogenized, and the mixture is then introduced into the mold cavity and is cross-linked, while the magnetic filler materials are magnetized and aligned.

13. The method in accordance with claim 5, wherein the starting material is cooled in a static mixer and is homogenized and is transferred out of the static mixer by a cooled screw into a heated tool defining the mold cavity and is shaped into the molding by injection-molding or by an extrusion method.

14. The method in accordance with claim 1, wherein the molding is temperature-regulated in a subsequent step.

* * * * *